(12) United States Patent
Matsuzaki

(10) Patent No.: US 11,381,688 B2
(45) Date of Patent: Jul. 5, 2022

(54) IMAGE FORMING APPARATUS AND METHOD OF CONTROLLING IMAGE FORMING APPARATUS

(71) Applicant: CANON KABUSHIKI KAISHA, Tokyo (JP)

(72) Inventor: Masanori Matsuzaki, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/836,201

(22) Filed: Mar. 31, 2020

(65) Prior Publication Data

US 2020/0344360 A1 Oct. 29, 2020

(30) Foreign Application Priority Data

Apr. 25, 2019 (JP) .............................. JP2019-084641

(51) Int. Cl.
*H04N 1/00* (2006.01)
*H04N 1/107* (2006.01)
*H04N 1/60* (2006.01)
*G06F 3/12* (2006.01)

(52) U.S. Cl.
CPC ..... *H04N 1/00018* (2013.01); *H04N 1/00822* (2013.01); *H04N 1/1074* (2013.01); *H04N 1/6002* (2013.01); *H04N 1/6033* (2013.01)

(58) Field of Classification Search
CPC .. G06K 5/22; G06K 15/1876; G06K 15/1877; G06K 15/1881; H04N 1/4058; H04N 1/52; H04N 1/58; H04N 1/62; H04N 1/00018; H04N 1/00822; H04N 1/1074; H04N 1/00045; H04N 1/00087; H04N 1/00819; H04N 2201/0005; H04N 2201/0448; G03F 5/22
USPC .................................................. 358/533, 474
See application file for complete search history.

(56) References Cited

U.S. PATENT DOCUMENTS

| | | | |
|---|---|---|---|
| 5,553,171 A * | 9/1996 | Lin | ........................ G06T 3/4007 358/445 |
| 2005/0078163 A1* | 4/2005 | Damera-Venkata | ... G03B 35/14 347/106 |
| 2006/0017758 A1* | 1/2006 | Nambudiri | ....... G07B 17/00508 347/14 |

(Continued)

FOREIGN PATENT DOCUMENTS

| | | |
|---|---|---|
| JP | 2009-239357 A | 10/2009 |
| JP | 2009290866 A * | 12/2009 |

*Primary Examiner* — Chad Dickerson
(74) *Attorney, Agent, or Firm* — Canon U.S.A., Inc. IP Division

(57) ABSTRACT

An image forming apparatus includes a first reading unit configured to read a first image on a first surface of a document, a second reading unit configured to read a second image on a second surface of the document different from the first surface, a printing unit configured to print a third image on a sheet, and a setting unit configured to set resolution of the third image printed by the printing unit. The printing unit prints the third image on the sheet with the resolution set by the setting unit. The printing unit also prints a fourth image with resolution lower than or equal to a threshold, without using the set resolution, the fourth image used for correction of at least a color value obtained by reading the second image using the second reading unit.

18 Claims, 12 Drawing Sheets

(56) References Cited

U.S. PATENT DOCUMENTS

| | | | |
|---|---|---|---|
| 2009/0161185 A1* | 6/2009 | Hashizume | H04N 1/6052 |
| | | | 358/518 |
| 2009/0244661 A1* | 10/2009 | Hashizume | H04N 1/00055 |
| | | | 358/505 |
| 2013/0003084 A1* | 1/2013 | Hirose | H04N 1/4078 |
| | | | 358/1.2 |
| 2013/0016408 A1* | 1/2013 | Lee | H04N 1/40075 |
| | | | 358/505 |
| 2015/0373227 A1* | 12/2015 | Ikari | G06K 15/1869 |
| | | | 358/2.1 |
| 2017/0150111 A1* | 5/2017 | Dong | H04N 9/646 |

* cited by examiner

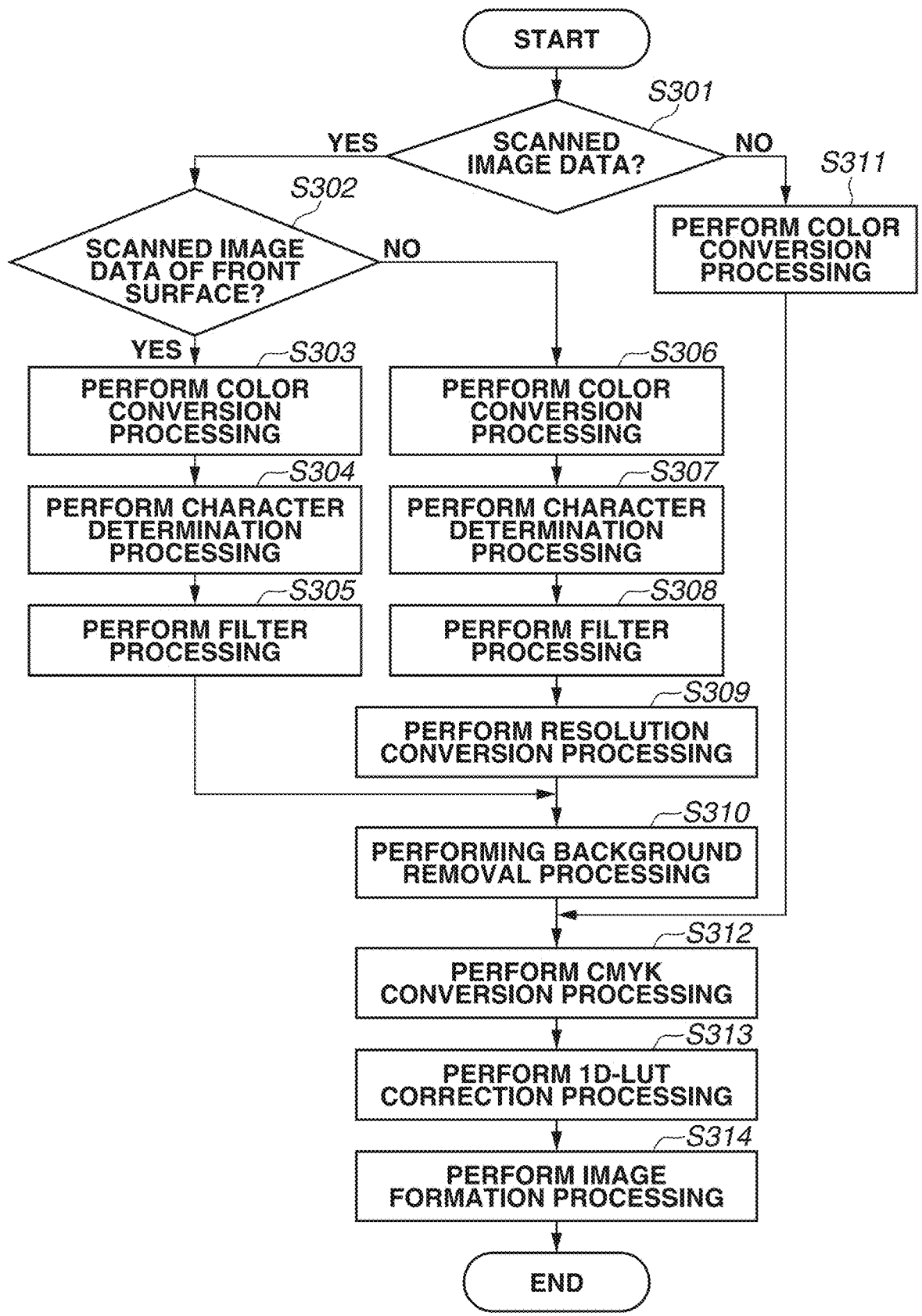

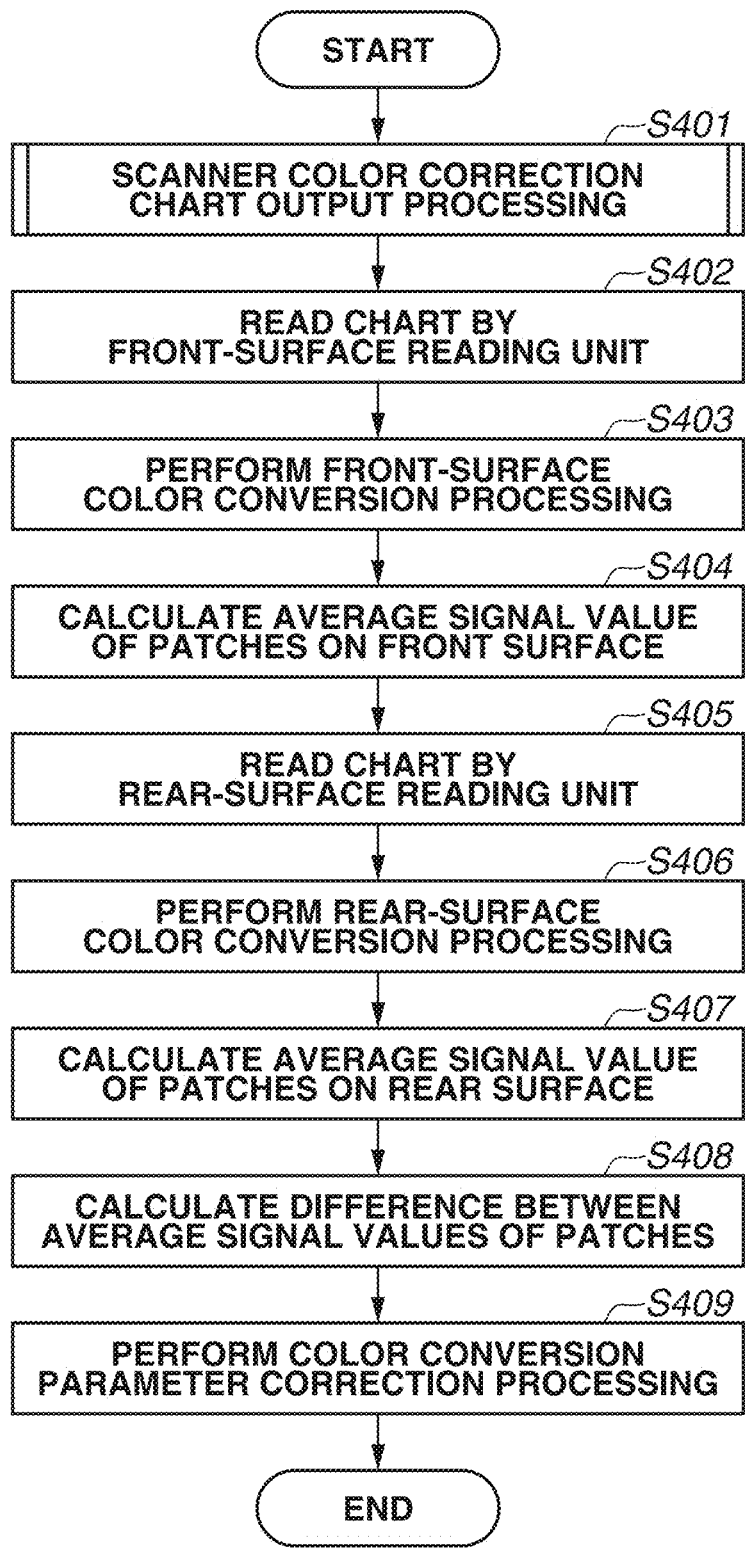

| SCREEN SETTING | RESOLUTION (NUMBER OF LINES) | | | |
|---|---|---|---|---|
| | C | M | Y | K |
| SCREEN 1 | 190 | 190 | 190 | 190 |
| SCREEN 2 | 105 | 105 | 105 | 105 |
| SCREEN 3 | 141 | 141 | 170 | 141 |
| SCREEN 4 | 141 | 141 | 141 | 170 |

| SCREEN SETTING | MOIRÉ OCCURRENCE RISK | | | |
|---|---|---|---|---|
| | C | M | Y | K |
| SCREEN 1 | PRESENT | PRESENT | PRESENT | PRESENT |
| SCREEN 2 | ABSENT | ABSENT | ABSENT | ABSENT |
| SCREEN 3 | ABSENT | ABSENT | PRESENT | ABSENT |
| SCREEN 4 | ABSENT | ABSENT | ABSENT | PRESENT |

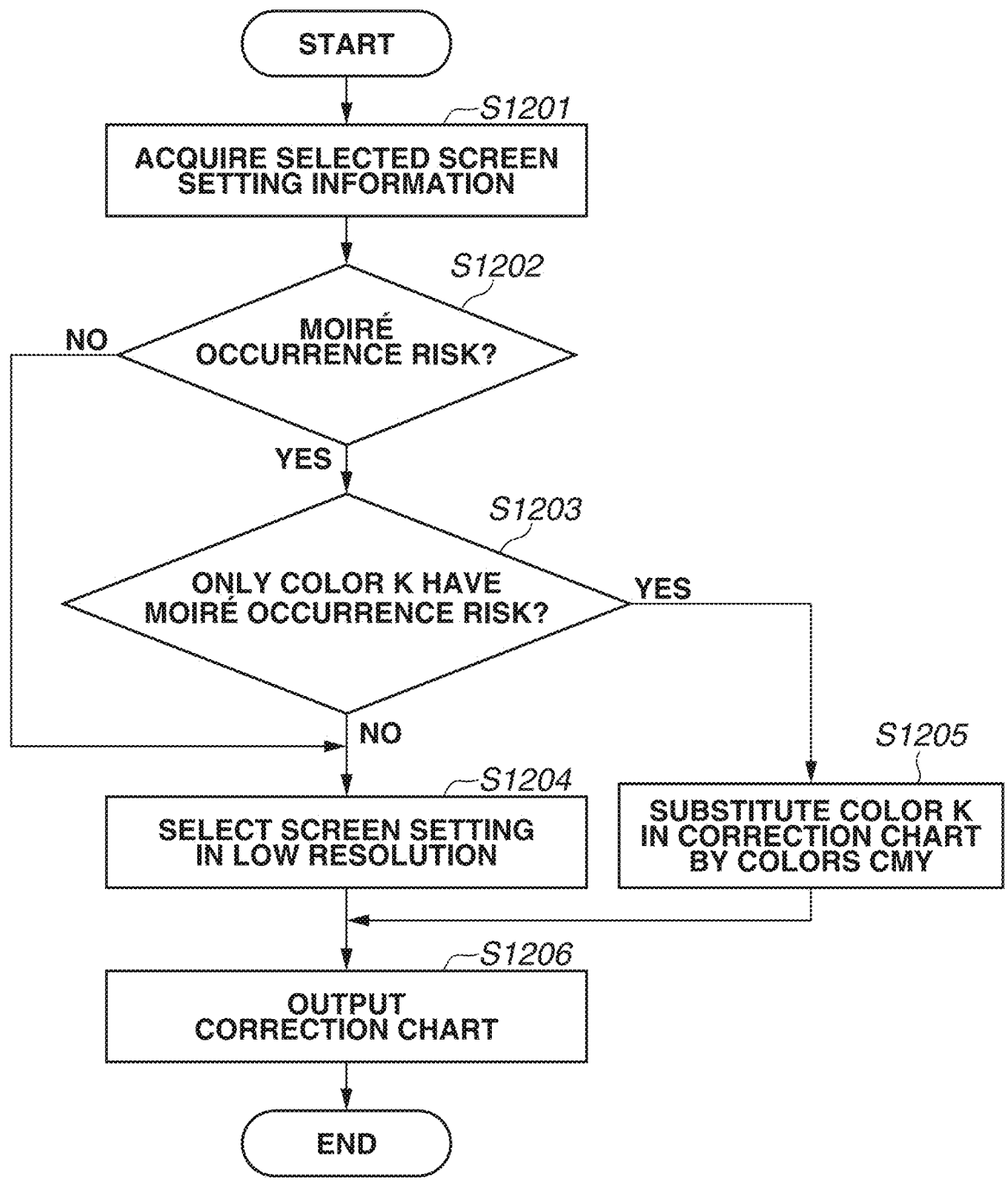

IMAGE FORMING APPARATUS AND METHOD OF CONTROLLING IMAGE FORMING APPARATUS

BACKGROUND

Field

The present disclosure relates to an image forming apparatus and a method of controlling the image forming apparatus.

Description of the Related Art

In calibration discussed in Japanese Patent Application Laid-Open No. 2009-239357, a document is read by a front-surface reading unit and a rear-surface reading unit, and in a case where color values acquired by the respective units are different from each other, the difference is corrected. According to Japanese Patent Application Laid-Open No. 2009-239357, a chart document to be used for correction of the difference is output by a printer, the output chart document is read by the front-surface reading unit and the rear-surface reading unit to calculate the difference, and calculates a correction value.

SUMMARY

It has now been determined that a rear-surface reading unit, low in use frequency, may have a reduced performance for cost reduction. More specifically, a reading unit having resolution of 600 dots per inch (dpi) is used for a front surface reading unit, whereas a reading unit having resolution of 300 dpi is used for a rear surface reading unit.

Meanwhile, in some cases, image printing resolution of an image forming apparatus is set higher than reading resolution of the reading units, for high definition image printing.

When an image processing apparatus including the above-described reading units reads a chart document of, for example, 190 lines per inch (lpi), moiré occurs on the image read by the reading unit having the reading resolution half the value of which is lower than the resolution of the chart document.

Consequently, if the setting of resolution of an image to be printed in printing of a chart document is used unchanged, the difference between the color value by the front-surface reading unit and the color value by the rear-surface reading unit cannot be accurately determined, which may deteriorate correction accuracy.

In consideration of the above, the present disclosure features reducing or preventing deterioration of correction accuracy in an image forming apparatus that reads a chart document by a plurality of reading units and corrects a difference between acquired color values.

According to an aspect of the present disclosure, an image forming apparatus includes a first reading unit configured to read a first image on a first surface of a document, a second reading unit configured to read a second image on a second surface of the document, the second surface different from the first surface, a printing unit configured to print a third image on a sheet, and a setting unit configured to set resolution of the third image printed by the printing unit, wherein the printing unit prints the third image on the sheet with the resolution set by the setting unit, and wherein the printing unit prints a fourth image with resolution lower than or equal to a threshold, without using the set resolution, the fourth image used for correction of at least a color value obtained by reading the second image using the second reading unit.

Further features of the present disclosure will become apparent from the following description of exemplary embodiments with reference to the attached drawings.

BRIEF DESCRIPTION OF THE DRAWINGS

FIG. 3 is a flowchart illustrating an example of image processing performed on image data.

FIG. 4 is a flowchart illustrating an example of processing to correct a three-dimensional lookup table (3D-LUT) to be used for color conversion processing of the scanner.

FIG. 12 is a flowchart illustrating an example of the processing to output the correction chart.

DESCRIPTION OF THE EMBODIMENTS

Some exemplary embodiments of the present disclosure are described below with reference to drawings. Configurations described in the following exemplary embodiments are illustrative, and the present disclosure is not limited to the illustrated configurations.

In a first exemplary embodiment, a method of determining moir occurrence risk when a chart to correct a signal value difference between a front-surface reading unit and a rear-surface reading unit is output.

Figure 1:
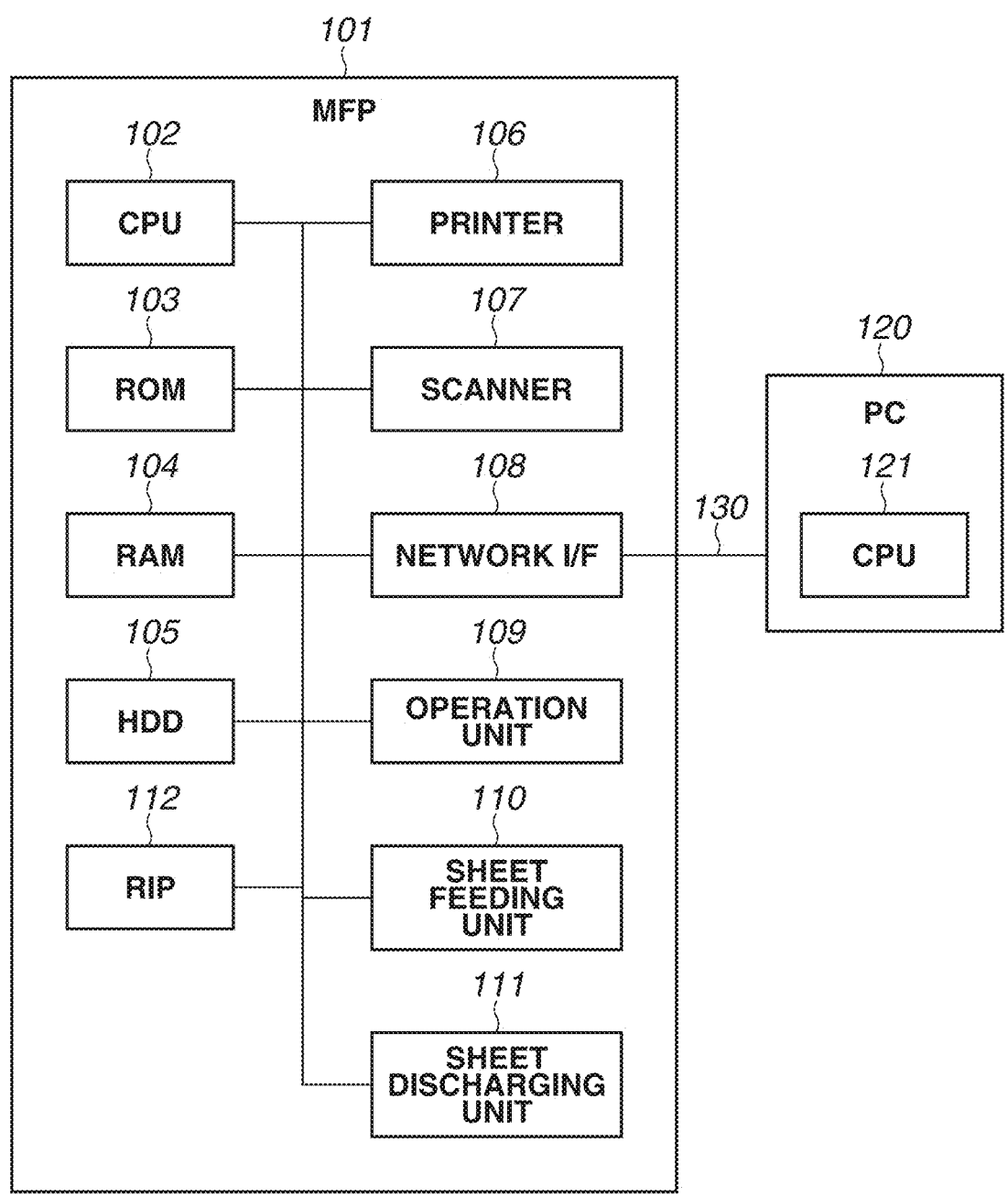
FIG. 1 is a diagram illustrating an example of an image processing system.

FIG. 1 is a diagram illustrating an example of an image processing system. A personal computer (PC) 120 that is an example of an information processing apparatus is connected to a multifunctional peripheral (MFP) 101 that is an example of an image forming apparatus, via a network 130. The PC 120 transmits print data to the MFP 101 in response to an instruction from a central processing unit (CPU) 121 included in the PC 120.

A hardware configuration of the MFP 101 is described in detail. The MFP 101 includes a CPU 102, a read-only memory (ROM) 103, a random access memory (RAM) 104, a hard disk drive (HDD) 105, a printer 106, a scanner 107, a network interface (I/F) 108, and an operation unit 109.

The MFP 101 further includes a sheet feeding unit 110, a sheet discharging unit 111, and a raster image processor (RIP) 112.

The CPU 102 controls various kinds of hardware 103 to 112 included in the MFP 101, to realize various functions of the MFP 101. The CPU 102 transmits signals to the various kinds of hardware via a bus line and performs mutual data communication with the other hardware.

The ROM 103 stores programs and various kinds of data to be used by the CPU 102. The RAM 104 is a work memory that temporarily stores programs and data used by the CPU 102 for calculation. The HDD 105 stores various kinds of data, various kinds of programs, etc. While an example in which the MFP 101 according to the present exemplary embodiment uses the HDD as an auxiliary storage device is described, a nonvolatile memory such as a solid state drive (SSD) may be used as the auxiliary storage device.

The printer 106 is a unit to realize a printing function, and performs processing to print an image on a sheet based on image data included in a print job that is transmitted from the PC 120 through the network 130. Further, the printer 106 can print a correction chart that is a predetermined image described below.

The scanner 107 includes an auto document feeder (ADF). The scanner 107 is a unit that realizes a scan function, and performs processing to optically read a document and to convert the read document into image data. The scanner 107 irradiates images of a bundle of documents or one document with light from a light source (not illustrated), and forms a reflected image of the document on a solid-state imaging device such as a charge coupled device (CCD) sensor by a lens. Further, the scanner 107 generates the image data based on a raster image read signal from the solid-state imaging device. The detail of the scanner 107 is described below.

The CPU 102 of the MFP 101 controls operation of the MFP 101 according to a control program in the MFP 101. More specifically, the CPU 102 executes an operating system (OS) for control of the MFP 101 and a driver program for control of a hardware interface. Application programs on the OS mutually operate, operation and control of a function desired by the user are performed by application programs on the OS co-operating with each other. The OS and the various kinds of programs are stored in the ROM 103, and are executed after being read from the ROM 103 to the RAM 104.

While, in the MFP 101, one CPU 102 performs various processing of flowcharts described below using one memory (RAM 104), the other configuration is adoptable. For example, a plurality of CPUs, RAMs, ROMs, and storages may be cooperated with one another to perform various processing illustrating in the flowcharts described below. Alternatively, the processing may be performed by a hardware circuit such as an application specific integrated circuit (ASIC) and a field-programmable gate array (FPGA).

The network I/F 108 of the MFP 101 may be a local area network interface (LAN_I/F) for wired connection, or may be connected with the network 130 by a universal serial bus (USB)-LAN adopter. The network I/F 108 may be a LAN_I/F for wireless connection.

The network I/F 108 of the MFP 101 is connected to the PC 120 through the network 130.

The operation unit 109 is a user interface for the user using the MFP 101 to use the printer 106, the scanner 107, etc., and receives a user's operation and input as, for example, a touch panel. The operation unit 109 can also be used as a display unit that displays information on the MFP 101. In the MFP 101 according to the present exemplary embodiment, an operation device and a display device may be connected to outside.

The RIP 112 is a hardware module that performs rasterizing processing to develop a page description language (PDL) to a raster image. While, in the present exemplary embodiment, an example in which the RIP 112 is incorporated as the hardware is described, the RIP 112 may be stored as software in the ROM 103.

The sheet feeding unit 110 feeds a sheet on which an image is to be printed by the printer 106. The sheet discharging unit 111 discharges the sheet on which the image has been printed by the printer 106, to a discharge tray (not illustrated).

Figure 2:
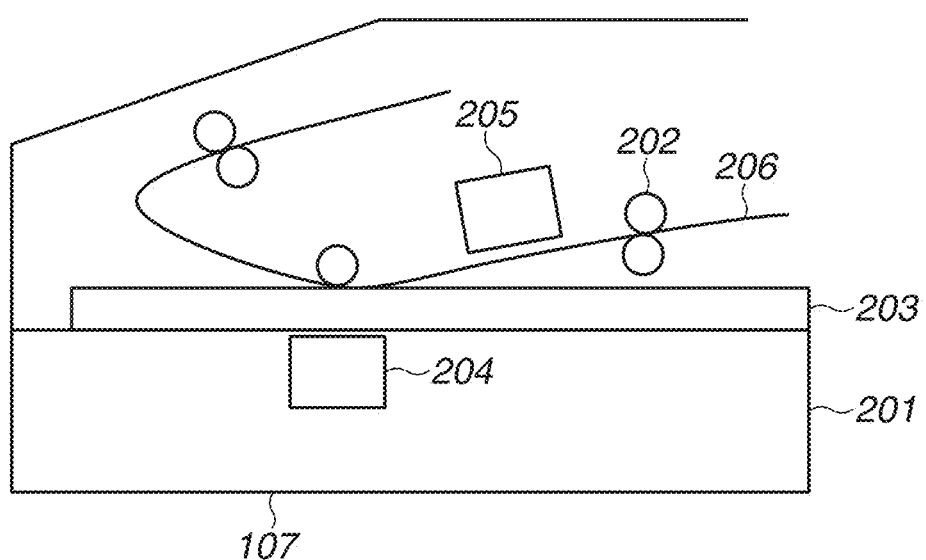
FIG. 2 is a diagram illustrating an example of a scanner of a multifunctional peripheral (MFP).

The scanner 107 of the MFP 101 is described with reference to FIG. 2. FIG. 2 is a diagram illustrating an example of the scanner 107 of the MFP 101.

A document platen 201 internally includes a front-surface reading unit 204. The front-surface reading unit 204 internally includes a light source and a solid-state imaging device, and acquires an image read signal through a glass platen 203.

A sheet 206 is conveyed by rollers 202, etc. When the sheet 206 is conveyed, the front-surface reading unit 204 is fixed, and irradiates the sheet 206 that has reached a reading position of the front-surface reading unit 204, with light from the light source, to form a reflected image on the solid-state imaging device.

A rear-surface reading unit 205 is a device to read a rear surface of the sheet, and a position of the rear-surface reading unit 205 is fixed. As with the front-surface reading unit 204, the rear-surface reading unit 205 irradiates the sheet that has conveyed and reached a reading position of the rear-surface reading unit 205, with light from a light source, to form a reflected image on a solid-state imaging device. Unlike the front-surface reading unit 204, the rear-surface reading unit 205 irradiates the rear surface of the sheet 206 with the light from the light source.

As described above, using the two types of reading devices, the front surface (one surface) and the rear surface (surface different from one surface) of the sheet can be concurrently read in one conveyance.

Since the front-surface reading unit 204 and the rear-surface reading unit 205 are devices independent of each other, the devices may have different performance. In the present exemplary embodiment, the front-surface reading unit 204 can acquire image data of resolution up to 600 dots per inch (dpi), and the rear-surface reading unit 205 can acquire image data of resolution up to 300 dpi.

Image processing in copy processing for printing an image on a sheet based on image data generated by scanning and image processing of PDL data received from the PC 120, etc. are described with reference to FIG. 3. FIG. 3 is a flowchart illustrating an example of image processing performed on image data. The processing in the flowchart of FIG. 3 is realized by the CPU 102 reading out a program stored in the ROM 103 to the RAM 104 and executing the program. The processing of the flowchart illustrated in FIG. 3 is started, for example, when a print job is transmitted from the PC 120 via the network 130, or when the user instructs execution of copy processing using the operation unit 109, the image of the document is read by the scanner 107, and the image data is generated. The flowchart of FIG. 3 illustrates the processing to be performed on the generated or received image data for one page, and the processing is repeated until unprocessed image data is not present.

In step S301, the CPU 102 determines whether image stored in the RAM 104 or the HDD 105 is image data (scanned image data) that has been generated by reading of the image of the document by the scanner 107 under the control of the CPU 102. In a case where the image data is the scanned image data (YES in step S301), the processing proceeds to step S302. Otherwise, namely, in a case of a print job received from the PC 120, etc. (NO in step S301), the processing proceeds to step S311.

In step S302, the CPU 102 determines whether the image data in step S301 is scanned image data of a front surface. In other words, the CPU 102 determines whether the image data has been generated from a signal acquired by image reading using the front-surface reading unit 204. When the image is read by the front-surface reading unit 204 or the rear-surface reading unit 205, information representing that the image has been read by which of the front-surface reading unit 204 and the rear-surface reading unit 205 is stored in the RAM 104 or the HDD 105. In this processing, the information representing that the image has been read by which of the front-surface reading unit 204 and the rear-surface reading unit 205 may be stored in association with the scanned image data.

In a case where the image data is the scanned image data of the front surface (YES in step S302), the processing proceeds to step S303. Otherwise (NO in step S302), the processing proceeds to step S306.

In step S303, the CPU 102 performs color conversion processing on the scanned image data. In this processing, RGB image data (scanned image data) dependent on the front-surface reading unit 204 is converted into RGB image data independent on the device, using a three-dimensional lookup table (3D-LUT). The 3D-LUT is stored in the HDD 105.

In step S304, the CPU 102 performs character determination processing on the RGB image data generated in step S303. In this processing, an edge, etc. of the image is detected to generate character determination data.

In step S305, the CPU 102 performs filter processing on the RGB image data. In this processing, different filter processing is performed between a part determined as characters and the other part, using the character determination data generated in step S304.

In a case where it is determined in step S302 that the image data is not the scanned image data of the front surface (NO in step S302), in step S306, the CPU 102 performs the color conversion processing on the scanned image data of the rear surface. In this processing, the RGB image data dependent on the rear-surface reading unit 205 is converted into RGB image data independent on the device, with use of a 3D-LUT. Since the reading unit is not the front-surface reading unit 204, a 3D-LUT different from the 3D-LUT in step S303 is used.

In step S307, the CPU 102 performs the character determination processing on the RGB image data generated in step S306. In this processing, an edge, etc. of the image is detected to generate character determination data.

In step S308, the CPU 102 performs the filter processing on the RGB image data. In this processing, different filter processing is performed between a part determined as characters and a part determined as not characters, using the character determination data generated in step S307.

In step S309, the CPU 102 performs resolution conversion processing on the RGB image data. Since the rear-surface reading unit 205 reads the image with reading resolution of 300 dpi, the resolution is converted into 600 dpi in order to match the resolution to resolution of the front-surface reading unit 204 if the front-surface reading unit 204 reads the image with reading resolution of 600 dpi.

In step S310, the CPU 102 performs background removal processing on the RGB image data, to remove a background color component.

In step S312, the CPU 102 performs CMYK conversion processing using a 3D-LUT for conversion from RGB to CMYK to generate CMYK image data from the RGB image data.

In step S313, tone characteristics of each single color of C, M, Y, and K is corrected using a one-dimensional LUT (1D-LUT) for correction of each of the colors C, M, Y, and K.

In step S314, image formation processing is performed using screen processing to generate a binary CMYK image.

In a case where it is determined in step S301 that the image is not the scanned data, the CPU 102 performs the color conversion processing on the image data included in print data received from the PC 120, in step S311. In this processing, sRGB image data is converted into RGB image data independent on the device, using a 3D-LUT.

Since the color conversion processing is performed in step S303 or S306 based on the characteristics of the front-surface reading unit 204 and the rear-surface reading unit 205, the same signal value is output when the same document is read, in principle. However, the signal value of the scanned image data acquired by the reading device may be varied due to individual difference and aged deterioration of the reading device, and a difference may occur in each reading device. To reduce the difference, processing to correct the 3D-LUT to be used in the color conversion processing is performed.

The processing to correct the 3D-LUT used in the color conversion processing of the scanner 107 according to the present exemplary embodiment is described with reference to FIG. 4. FIG. 4 is a flowchart illustrating an example of the processing to correct the 3D-LUT to be used in the color conversion processing of the scanner 107. The processing of the flowchart illustrated in FIG. 4 is realized by the CPU 102 reading out a program stored in the ROM 103 to the RAM 104 and executing the program. The processing of the flowchart illustrated in FIG. 4 is started when the operation unit 109 is operated by the user and an instruction to print a 3D-LUT correction chart is received.

In step S401, the CPU 102 receives the instruction to print the 3D-LUT correction chart on a window (not illustrated) displayed on the operation unit 109, and controls the printer 106. The printer 106 prints the correction chart on a sheet. The detail of the processing is described with reference to FIG. 7. The user sets the correction chart on the scanner 107, and instructs execution of scanning on the window (not illustrated).

In step S402, the CPU 102 controls the scanner 107, and the scanner 107 reads an image (chart) of the set document by the front-surface reading unit 204, to generate image data (scanned image data).

In step S403, the CPU 102 performs color conversion processing for the front-surface reading unit 204 on the image data generated in step S402. In this processing, the color conversion processing same as the color conversion processing in step S303 is performed.

In step S404, the CPU 102 calculates an average signal value of patches of the RGB image data (chart) generated in step S403. The correction chart as a color chart includes a plurality of patches. Since each of the patches includes a plurality of pixels, the average value is calculated. The chart and the patches are described below.

In step S405, the CPU 102 controls the scanner 107, and the scanner 107 reads an image (chart) of the document that has been turned over and set, by the rear-surface reading unit 205, to generate image data (scanned image data). While, in the present exemplary embodiment, an example in which the correction chart is scanned twice (for front surface and rear surface) is described, the correction charts may be printed on respective surfaces of the sheet, and may be read by the front-surface reading unit 204 and the rear-surface reading unit 205 by one scanning.

In step S406, the CPU 102 performs color conversion processing for the rear-surface reading unit 205 on the image data generated in step S405. In this processing, the color conversion processing same as the color conversion processing in step S306 is performed.

In step S407, the CPU 102 calculates an average signal value of patches of the generated RGB image data (chart) in a manner like the processing in step S404.

In step S408, the CPU 102 calculates a difference between the average signal value of the patches on the front surface generated in step S404 and the average signal value of the patches on the rear surface generated in step S407.

In step S409, the CPU 102 uses the difference of the average signal values calculated in step S408 to correct parameters of the 3D-LUT so as to minimize the difference. In this processing, the parameters of the 3D-LUT to be used in the color conversion processing for the scanned image data of the rear surface in step S306 are corrected such that the RGB image data after the color conversion processing becomes close to the RGB image data generated by the color conversion processing performed on the scanned image data of the front surface.

Figure 5A:
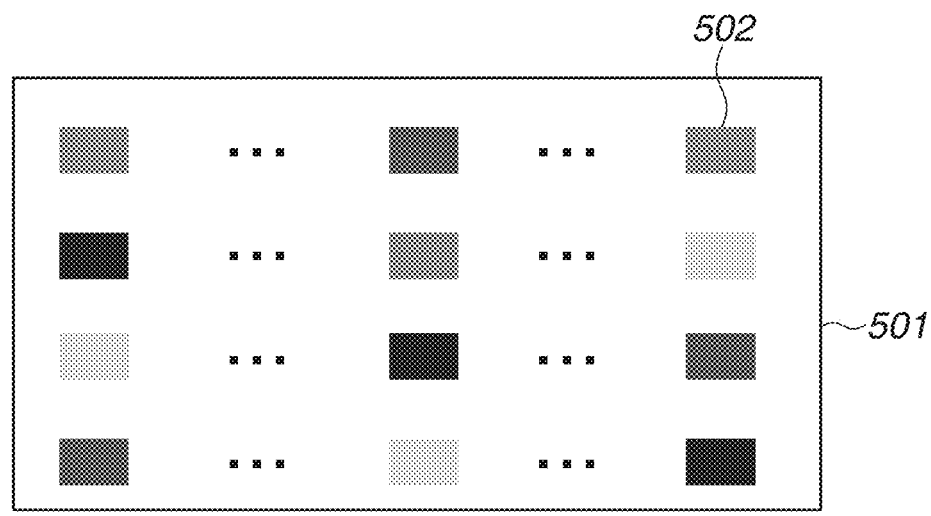
FIG. 5A is a diagram illustrating an example of a correction chart.
Figure 5B:
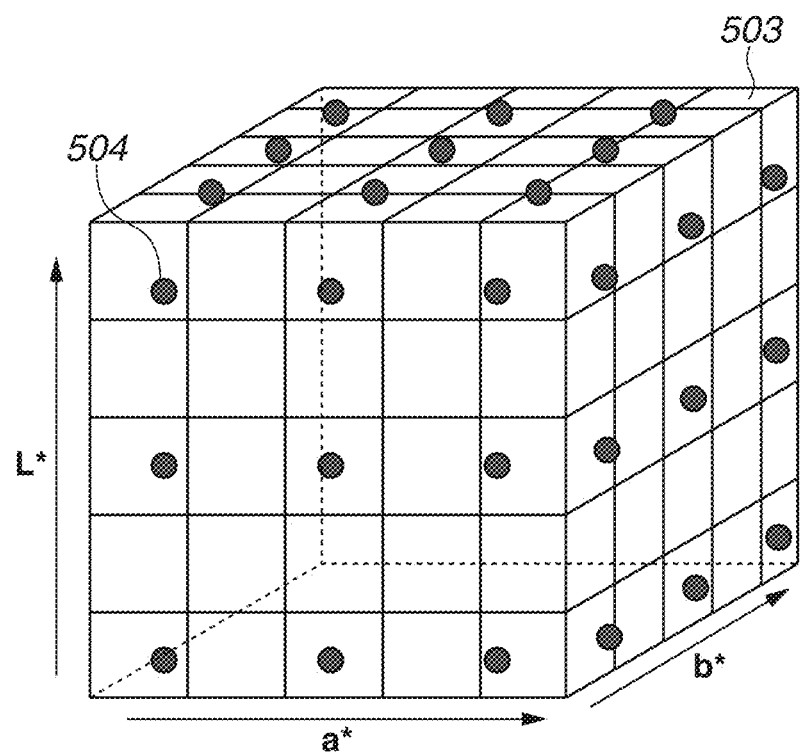
FIG. 5B is a diagram illustrating an example of a correction chart on a Lab space.

FIGS. 5A and 5B are diagrams illustrating an example of the correction chart and an example of a correction chart on a Lab space, respectively. FIG. 5A is a diagram illustrating an example of the correction chart. A chart 501 illustrated in FIG. 5A illustrates an example of the correction chart, and all of patches including a patch 502 printed on the chart 501 are expressed by mixed colors obtained by combining the colors C, M, Y, and K. Each of the patches is an area including the same signal value of a specific combination. The patches of the chart 501 are arranged so as to be uniform with respect to human vision.

FIG. 5B is a diagram illustrating an example of the correction chart on the Lab space. A Lab color space 503 is associated with human vision characteristics, and includes three-dimensional axes of L*, a*, and b*. Lattice points 504 indicate data of the respective patches of the chart 501, and are calculated by measuring the chart 501 output from a printer by a measurement device. As illustrated in FIG. 5B, the data of the chart is uniformly arranged in the Lab color space. This indicates that the data are arranged to be uniform with respect to human vision.

As described above, by arranging the patches to be uniform with respect to human vision, the whole of the color space can be corrected by the limited number of patches.

The rear-surface reading unit, low in use frequency, may have a reduced performance for cost reduction. More specifically, a reading unit having resolution of 600 dpi is used for the front surface reading unit, whereas a reading unit having resolution of 300 dpi is used for the rear surface reading unit.

Meanwhile, image forming resolution of the image forming apparatus is set higher than the reading resolution of the reading units, for high definition image printing in some cases. When the image processing apparatus including the above-described reading units reads a chart document having resolution of, for example, 190 lines per inch (lpi), moiré occurs on the image read by the reading unit having the reading resolution half the value of which is lower than the resolution of the chart document.

Consequently, if the setting of resolution of an image to be printed in printing of the chart document is used unchanged, the difference between the color value by the front-surface reading unit and the color value by the rear-surface reading unit cannot be accurately determined, which may deteriorate correction accuracy.

By the following processing with respect to the above described issue, deterioration of the correction accuracy can be reduced or prevented in the image forming apparatus that reads the chart document by the plurality of reading units and corrects the difference between the acquired color values.

Figure 7:
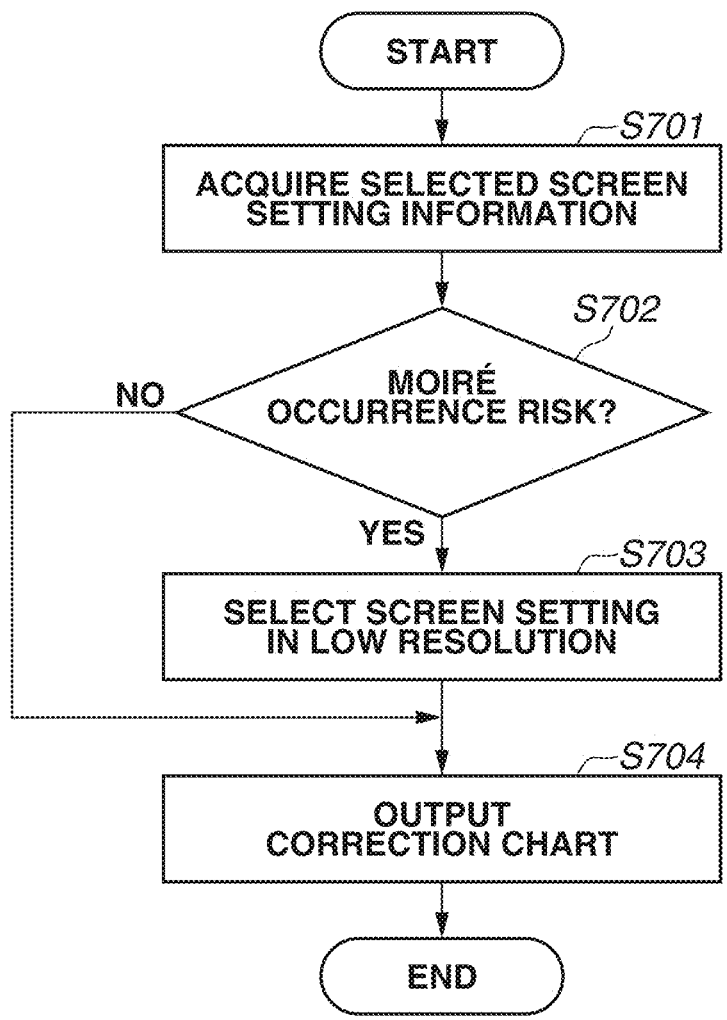
FIG. 7 is a flowchart illustrating an example of processing to output a correction chart.

FIG. 7 is a flowchart illustrating an example of the processing to output the correction chart. The processing in the flowchart of FIG. 7 is realized by the CPU 102 reading out a program stored in the ROM 103 to the RAM 104 and executing the program. The processing of the flowchart illustrated in FIG. 7 is started when the operation unit 109 is operated by the user and the instruction to print the 3D-LUT correction chart is received.

Figures 9A, 9B, 9C:
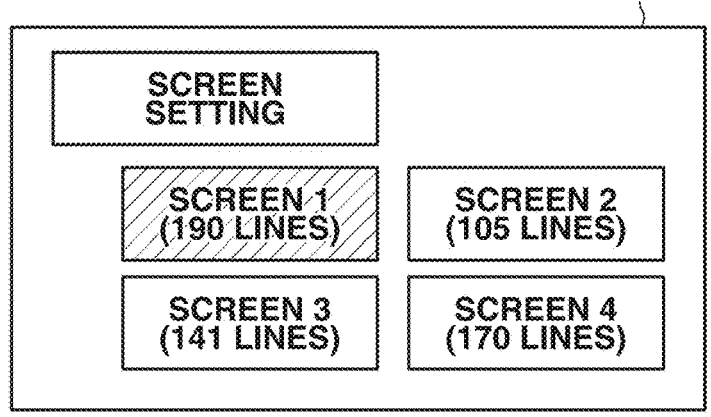
FIGS. 9A, 9B, and 9C are diagrams illustrating a setting window and an example of relationship of set values and moiré generation risk.

In step S701, the CPU 102 acquires image formation information selected in the MFP 101. The image formation information selected in the MFP 101 indicates screen setting selected by the user on a screen setting window of FIG. 9A displayed on the operation unit 109. In FIG. 9A, a screen setting of 190 lines is selected.

In step S702, the CPU 102 determines whether there is a moiré occurrence risk in scanning, based on the image formation information acquired in step S701.

Figure 6A:
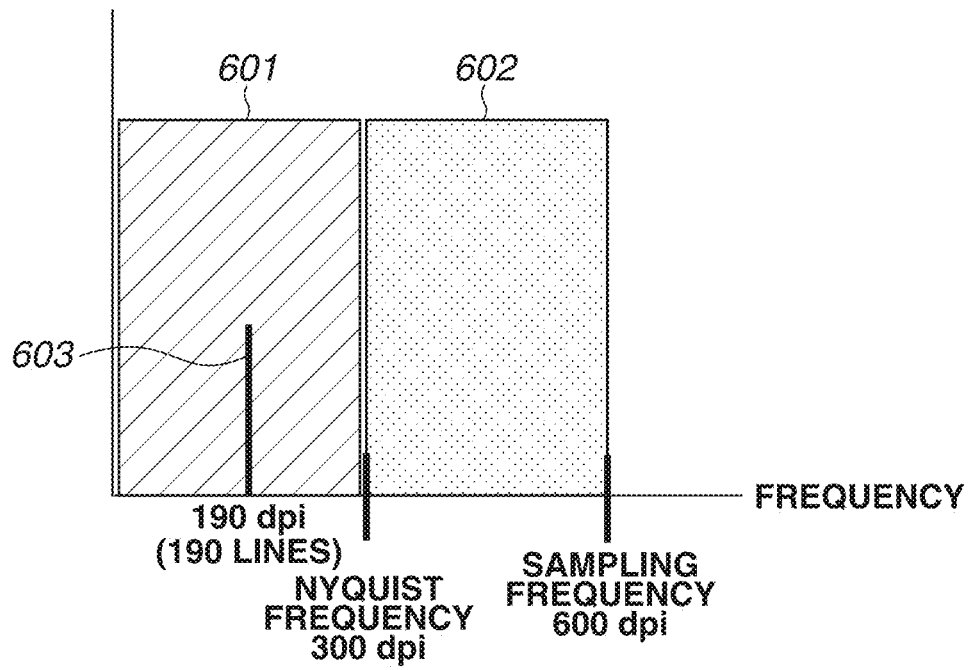
FIGS. 6A and 6B are diagrams each illustrating an example of relationship between a sampling frequency, a Nyquist frequency, and a screen setting.
Figure 6B:
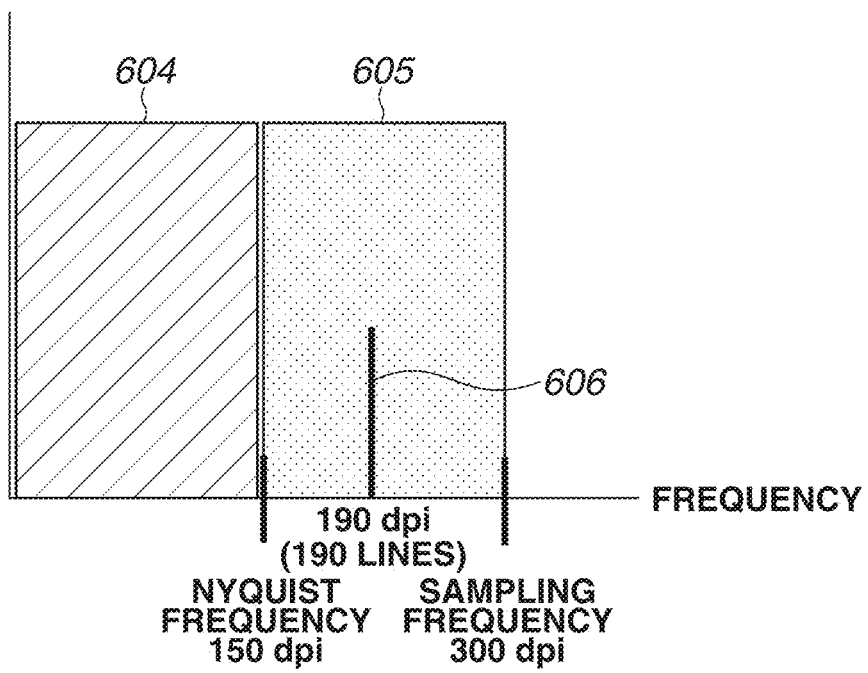

The reason why moiré occurs in scanning is described with reference to FIGS. 6A and 6B. FIGS. 6A and 6B are diagrams each illustrating relationship between a sampling frequency, a Nyquist frequency, and a screen setting. FIG. 6A is a diagram illustrating the relationship in the chart output by the front-surface reading unit 204 having the resolution of 600 dpi and the screen of 190 lines.

In the front-surface reading unit 204 having the resolution of 600 dpi, the sampling frequency is 600 dpi, and the Nyquist frequency is 300 dpi that is a half of the sampling frequency. In a case where the resolution (number of lines) of the image of the scanned document is higher than the Nyquist frequency, folding occurs, which causes moiré. In a case where the number of lines of the scanned document is lower than or equal to the Nyquist frequency, folding does not occur. Accordingly, moiré does not occur. The number of lines indicates the number of print lines or the number of screen lines, and is a value presenting the number of halftone dots per one inch. Further, the number of lines is a type of resolution.

In the example of FIG. 6A, an area 601 is an area where moiré does not occur, and an area 602 is an area where moiré occurs. In a case where the resolution (number of lines) of the chart is 190 lines that is lower than or equal to the Nyquist frequency, moiré does not occur. In the example of FIG. 6A, resolution (number of lines) 603 of the chart is in the area 601. In other words, the resolution (number of lines) of the chart is lower than the Nyquist frequency, and accordingly, moiré does not occur.

FIG. 6B is a diagram illustrating the relationship in the chart output by the rear-surface reading unit 205 having the resolution of 300 dpi and the screen of 190 lines. In the rear-surface reading unit 205 having the resolution of 300 dpi, the sampling frequency is 300 dpi, and the Nyquist frequency is 150 dpi that is a half of the sampling frequency. In the example of FIG. 6B, an area 604 is an area where moiré does not occur, and an area 605 is an area where moiré occurs. In a case where the number of lines of the chart is 190 lines that is higher than the Nyquist frequency, moiré occurs. In the example of FIG. 6B, resolution (number of lines) 606 of the chart is in the area 605. In other words, the resolution (number of lines) of the chart is higher than the Nyquist frequency, and accordingly, moiré occurs.

As described above, when the relationship with the resolution of the reading device is changed, moiré occurs even in the same chart, and the moiré causes the difference of the signal values, which influences on the processing for calculating the difference in step S408. Accordingly, accuracy of the correction processing in step S409 is deteriorated. Therefore, selecting the image formation not causing moiré can prevent deterioration of accuracy.

The resolution (number of lines) at output of the correction chart is set when the MFP 101 receives selection by the user via the setting window 901 in FIG. 9A displayed on the operation unit 109.

FIGS. 9A, 9B, and 9C are diagrams illustrating the setting window and an example of relationship between set values and moiré occurrence risk. FIG. 9A is a diagram illustrating an example of the setting window 901 for receiving a screen setting to be used when the printer 106 prints the image on a sheet.

FIG. 9B is a diagram illustrating an example of a correspondence table 902 representing the set values for each of the screen settings. The correspondence table 902 represents the number of lines of four types of screens, and the number of lines is set for each of the colors C, M, Y, and K. In a case of a screen 1, the number of lines of each of the colors CMYK is 190. There is a case where the number of lines is varied depending on the color, as with a screen 3 and a screen 4.

FIG. 9C is a diagram illustrating an example of a correspondence table 903 of the moiré occurrence risk for each of the screen settings.

The correspondence table 903 represents the moiré occurrence risk of the four types of screens. A method of calculating the moiré occurrence risk is described below. In a case where the screen 1 is selected, all of the colors have moiré occurrence risk. Therefore, it is determined in step S702 that there is the moiré occurrence risk.

Figure 8:
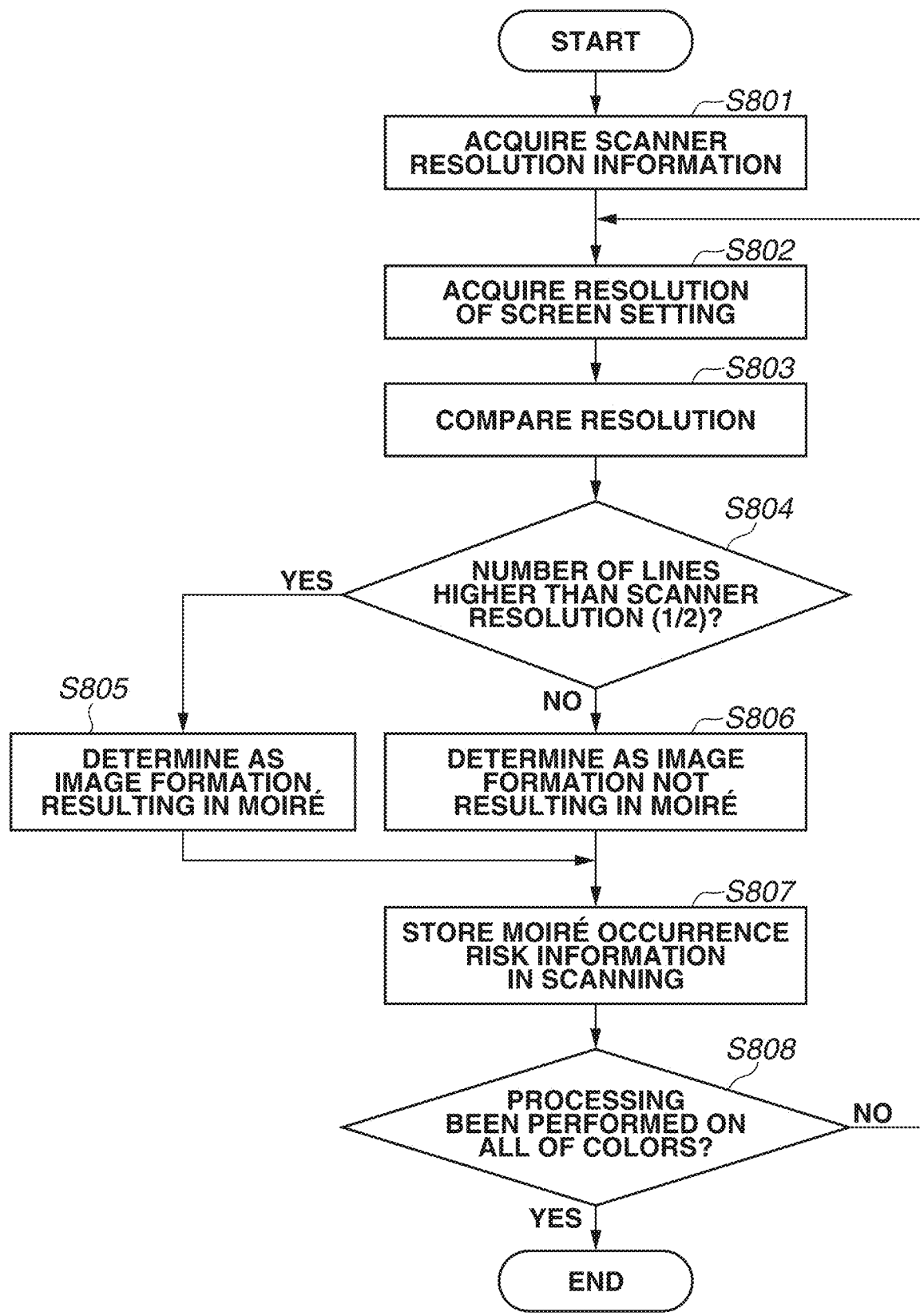
FIG. 8 is a flowchart illustrating an example of processing to determine moiré occurrence risk.

Processing to calculate the moiré occurrence risk is described with reference to FIG. 8. FIG. 8 is a flowchart illustrating an example of processing to determine the moiré occurrence risk. The processing of the flowchart illustrated in FIG. 8 is realized by the CPU 102 reading out a program stored in the ROM 103 to the RAM 104 and executing the program.

Further, a flow of FIG. 8 is started in response to end of the processing in step S701.

In step S801, the CPU 102 acquires resolution information on the scanner 107. In this processing, the CPU 102 acquires a lower one of the resolution of the front-surface reading unit 204 and the resolution of the rear-surface reading unit 205. In the case where the resolution of the front-surface reading unit 204 is 600 dpi and the resolution of the rear-surface reading unit 205 is 300 dpi, 300 dpi is used as the resolution information on the scanner 107.

In step S802, the CPU 102 acquires information on the screen setting selected on the setting window 901. For example, in a case where the "screen 1" has been selected, the CPU 102 acquires information representing that the "screen 1" has been selected. In this processing, information on one color that has not been subjected to the processing to determine the moiré occurrence risk among the colors (C, M, Y, and K) of the selected screen setting, is extracted.

In step S803, the CPU 102 compares the acquired resolution information on the scanner 107 and the information on the screen setting.

In step S804, in a case where the CPU 102 determines that the resolution (number of lines) of the screen setting is higher than a half of the resolution of the scanner 107, namely, is higher than the Nyquist frequency (YES in step S804), the processing proceeds to step S805. In step S805, the CPU 102 determines that the selected screen setting causes occurrence of moiré.

Meanwhile, in step S804, in a case where the CPU 102 determines that the resolution (number of lines) of the screen setting is lower than or equal to a half of the resolution of the scanner 107, namely, is lower than or equal to a threshold (lower than or equal to Nyquist frequency) (NO in step S804), the processing proceeds to step S806. In step S806, the CPU 102 determines that the selected screen setting does not cause occurrence of moiré.

In step S807, the CPU 102 stores the determination result as information representing the moiré occurrence risk in scanning, in the RAM 104 or the HDD 105.

In step S808, the CPU 102 determines whether the processing has been performed on all of the colors (C, M, Y, and K) of the selected screen setting. In a case where it is determined that the processing has been performed on all of the colors (C, M, Y, and K) (YES in step S808), the processing ends. Otherwise (NO in step S808), the processing returns to step S802 and is repeated.

While, in the present exemplary embodiment, the number of screen lines and the resolution of the reading device are compared to determine whether moiré occurs, the other determination information may be added. For example, in a case of bright toner such as yellow, moiré hardly occurs in reading by the reading unit. Therefore, in the case of yellow, the screen setting may be determined as screen setting not causing occurrence of moiré, irrespective of the resolution (number of lines) of the screen setting.

The flow of FIG. 7 is described again. The determination whether there is the moiré occurrence risk in step S702 is performed by reading out the information representing the moiré occurrence risk stored in step S807 from the RAM 104 or the HDD 105. In a case where the CPU 102 recognizes that the moiré occurrence risk is absent in all of the colors from the read information representing the moiré occurrence risk for each of the colors (C, M, Y, and K), the CPU 102 determines that the moiré occurrence risk is absent. Meanwhile, in a case where the CPU 102 recognizes that there is the moiré occurrence risk in at least one of the colors, the CPU 102 determines that there is the moiré occurrence risk.

In a case where it is determined that there is the moiré occurrence risk (YES in step S702), the processing proceeds to step S703. Otherwise (NO in step S702), the processing proceeds to step S704.

In step S703, the CPU 102 selects the screen setting of the resolution lower than the Nyquist frequency of the resolution of the scanner 107 acquired in step S801.

In step S704, the CPU 102 prints the correction chart on a sheet based on the screen setting selected in step S703 or the screen setting previously set in the setting window 901. The image data of the correction chart may be stored in the ROM 103 or the HDD 105 at factory shipping, or the image data received from the PC 102 via the network 130 may be stored in the ROM 103 or the HDD 105.

The screen setting selected in step S703 may be reset to the screen setting before selection in step S703, in response to end of the processing in step S704. In this case, the previous screen setting is stored in the HDD 105. The screen setting is reset to the screen setting before selection in step S703 without a user operation on the operation unit 109.

With the above-described processing, deterioration of the correction accuracy can be prevented in the image forming apparatus that reads the chart document by the plurality of reading units and corrects the difference between the acquired color values.

In the first exemplary embodiment, the example in which it is determined whether there is the moiré occurrence risk in the correction chart to be output when the difference between the signal value by the front-surface reading unit and the signal value by the rear-surface reading unit is corrected, and the screen setting is changed when it is determined that there is the moiré occurrence risk, has been described.

In a second exemplary embodiment, an example in which, when the screen setting not causing occurrence of moiré is selected, calibration processing is performed on the printer 106 to prevent visual uniformity of the output correction chart from being impaired due to change of the screen setting, is described.

Figure 11:
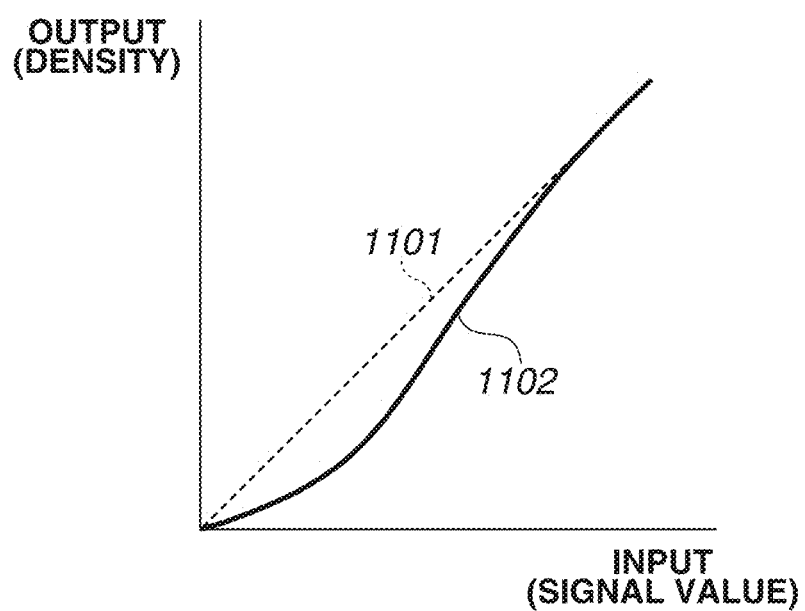
FIG. 11 is a diagram illustrating an example of relationship between an input signal value and output density of any of colors C, M, Y and K of the MFP.

FIG. 11 is a diagram illustrating an example of relationship between an input signal value and output density of any of the colors C, M, Y, and K of the MFP 101. Relationship between the input signal value and the output density based on the CMYK image data generated by the 1D-LUT correction processing in step S313 is represented by a straight line 1101. In the case represented by the straight line 1101, the screen 1 (190 lines) as default screen setting is selected.

For example, if the screen setting is changed to the screen 2 (105 lines) by the processing in step S703, dot reproducibility is changed from dot reproducibility of the default screen 1 (190 lines). Accordingly, the relationship between the input signal value and the output density is changed as represented by a curved line 1102. Accordingly, uniformity with respect to the vision of the correction chart 501 is impaired, and accuracy of the processing to correct the parameters of the 3D-LUT in step S409 is deteriorated. To prevent the deterioration, the following processing is performed.

Figure 10:
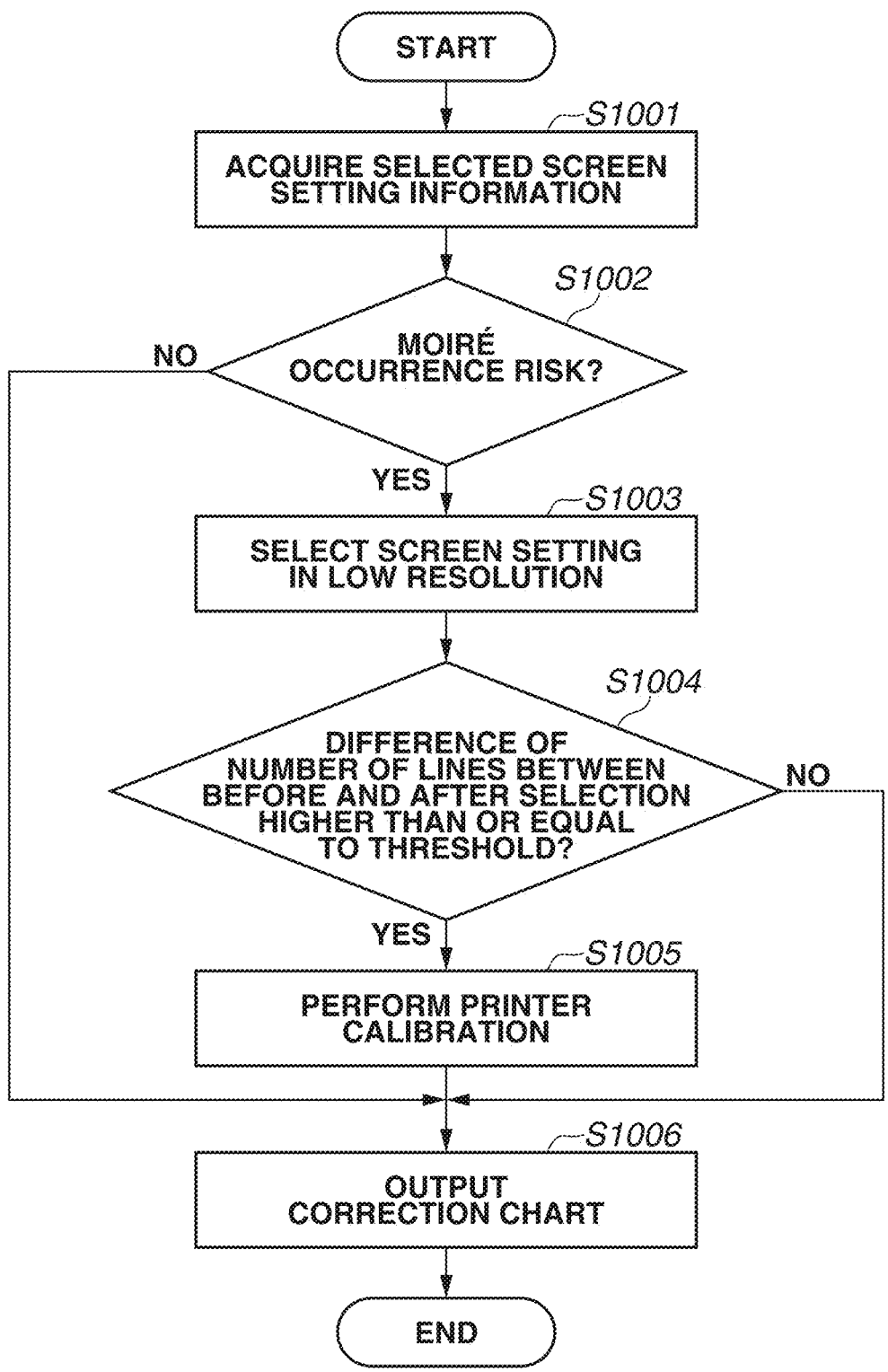
FIG. 10 is a flowchart illustrating an example of the processing to output the correction chart.

FIG. 10 is a flowchart illustrating an example of the processing to output the correction chart. The processing of the flowchart illustrated in FIG. 10 is realized by the CPU 102 reading out a program stored in the ROM 103 to the RAM 104 and executing the program. Further, the processing of the flowchart illustrated in FIG. 10 is started when the operation unit 109 is operated by the user and the instruction to print the 3D-LUT correction chart is received.

Processing in steps S1001 to S1003 are the same as the processing in steps S701 to S703 in FIG. 7, and therefore redundant description of the processing is omitted.

In step S1004, the CPU 102 calculates a difference between the resolution (number of lines) of the screen setting selected in step S1003 and the resolution (number of lines) of the screen setting before selection in step S1003, and determines whether the difference of the resolution (number of lines) is higher than or equal to a threshold. In the example of FIG. 9B, when the screen setting is changed from the screen 1 (190 lines) to the screen 2 (105 lines), the difference of the number of lines is 85 lines. In the present exemplary embodiment, the threshold is set to 50 lines. Since the difference of the number of lines is 85 lines, it is determined that the difference of the number of lines is higher than or equal to the threshold.

In a case where it is determined that the difference of the number of lines is higher than or equal to the threshold (YES in step S1004), the processing proceeds to step S1005. Otherwise (NO in step S1004), the processing proceeds to step S1006.

In step S1005, the CPU 102 performs the calibration processing to adjust color development of the printer 106. More specifically, the CPU 102 corrects the 1D-LUT to be used in the 1D-LUT correction processing in step S313 such that the characteristics of the curved line 1102 become the characteristics of the straight line 1101. Further specifically, the MFP 101 outputs a chart for calibration of the printer 106, reads the chart by the scanner 107, calculates the relationship between the input signal value and the output density to calculate the correction value of the 1D-LUT, to correct the 1D-LUT. In step S1006, the CPU 102 prints the correction chart on a sheet, based on the screen setting selected in step S1003 or the screen setting previously set in the setting window 901.

With the above-described processing, deterioration of the visual uniformity of the correction chart caused by the difference of the number of lines can be reduced or prevented.

In the first exemplary embodiment, the method in which it is determined whether there is the moiré occurrence risk in the output chart when the difference between the signal value by the front-surface reading unit and the signal value by the rear-surface reading unit is corrected, and the image formation is changed when it is determined that there is the moiré occurrence risk, has been described.

More specifically, since color reproduction equivalent to reproduction of the color K can be performed using the colors CMY, in a case where only the color K has the moiré occurrence risk among the colors of the selected screen setting, reproduction of the color K can be substituted by reproduction of the colors CMY without changing the screen setting. An example of this case will be described below.

A processing procedure for outputting the scanner color correction chart according to a third exemplary embodiment is described with reference to FIG. 12.

FIG. 12 is a flowchart illustrating an example of the processing for outputting the correction chart. The processing of the flowchart illustrated in FIG. 12 is realized by the CPU 102 reading out a program stored in the ROM 103 to the RAM 104 and executing the program. The processing of the flowchart illustrated in FIG. 12 is started when the operation unit 109 is operated by the user and the instruction to print the 3D-LUT correction chart is received.

Processing in steps S1201 and S1202 are the same as the processing in steps S701 and S702 in FIG. 7, and therefore redundant description of the processing is omitted.

In step S1202, in a case where it is determined that there is the moiré occurrence risk (YES in step S202), the processing proceeds to step S203. Otherwise (NO in step S1202), the processing proceeds to step S1204. In step S1203, the CPU 102 acquires the information representing the moiré occurrence risk stored in step S807, and determines whether only the color K has the moiré occurrence risk among the colors of the selected screen setting. In a case where it is determined that only the color K has the moiré occurrence risk (YES in step S1203), the processing proceeds to step S1205. Otherwise (NO in step S1203), the processing proceeds to step S1204. In the example of FIG. 9C, only the color K has the moiré occurrence risk in a screen 4. Therefore, in a case where the screen 4 is selected, it is determined that only the color K has the moiré occurrence risk. In a case where the screen 1 or the screen 3 is selected, the color other than the color K has the moiré occurrence risk. Therefore, it is determined that the color having the moiré occurrence risk is not only the color K. Processing in step S1204 is like the processing in step S703, and therefore redundant description of the processing is omitted.

In step S1205, the CPU 102 performs processing for substituting apiece of data on the color K in the CMYK image data of the correction chart by pieces of data on the colors CMY. For example, in a case of a color in which values of the colors CMYK are (50, 30, 20, and 30), the values are replaced with (80, 60, 50, and 0). The method of substituting the color K is optional. In step S1206, the CPU 102 prints the correction chart on a sheet based on the screen setting selected in step S204 or the screen setting previously set in the setting window 901.

In the case where only the color K has the moiré occurrence risk, the colors of the correction chart are replaced by performing the above-described processing, accuracy deterioration of the correction processing can be reduced or prevented without changing the screen setting.

Other Exemplary Embodiments

The present disclosure can be realized by supplying a program realizing one or more functions of the above-described exemplary embodiments to a system or an apparatus through a network or a storage medium and causing one or more processors in a computer of the system or the apparatus to read out and execute the program. Further, the present disclosure can be realized by a circuit (e.g., ASIC) realizing one or more functions.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the scope of the present disclosure is not limited to the particular disclosed exemplary embodiments. The scope of the following claims is to be accorded the broadest interpretation so as to encompass all such modifications and equivalent structures and functions.

This application claims the benefit of Japanese Patent Application No. 2019-084641, filed Apr. 25, 2019, which is hereby incorporated by reference herein in its entirety.

What is claimed is:

1. An image forming apparatus, comprising:
   a scanning unit configured to scan one or more images on a document;
   a printing unit configured to execute a printing process; and
   a setting unit configured to set resolution that is received from a user and that is to be used in the printing process executed by the printing unit,
   wherein the printing unit executes, using the set resolution lower than or equal to a threshold, the printing process for a predetermined image for adjusting a color value to be obtained by a scan of the document by the scanning unit,
   wherein the printing unit executes, using resolution lower than or equal to the threshold and not using the set second resolution higher than the threshold, the printing process for the predetermined image, and
   wherein the printing unit executes, using the set resolution, the printing process for an image different from the predetermined image even if the set resolution is higher than the threshold.

2. The image forming apparatus according to claim 1, wherein the scanning unit includes a first scanning unit configured to scan a first image on a first surface of the document and a second scanning unit configured to scan a second image on a second surface of the document different from the first surface.

3. The image forming apparatus according to claim 2, wherein the threshold is a value of ½ of a lower one of resolution of the first scanning unit and resolution of the second scanning unit.

4. The image forming apparatus according to claim 2, further comprising an adjusting unit configured to adjust a difference obtained by comparing a color value of the predetermined image scanned by the first scanning unit and a color value of the predetermined image scanned by the second scanning unit.

5. The image forming apparatus according to claim 4, further comprising
   a conversion unit configured to convert the color value obtained by the first scanning unit and the color value obtained by the second scanning unit with use of a lookup table,
   wherein the adjusting unit adjusts the lookup table.

6. The image forming apparatus according to claim 1, wherein the predetermined image is a color chart including a plurality of patches.

7. A method of controlling an image forming apparatus that includes a scanning unit configured to scan one or more images on a document, and a printing unit configured to execute a printing process, the method comprising:
   setting resolution,
   that is received from a user and that is to be used in the printing process executed by the printing unit,
   wherein the printing unit executes, using the set resolution lower than or equal to a threshold, the printing process for a predetermined image for adjusting a color value to be obtained by a scan of the document by the scanning unit, wherein the printing unit executes, using resolution lower than or equal to the threshold and not using the set resolution higher than the threshold, the printing process for the predetermined image, and wherein the printing unit executes, using the set resolution, the printing process for an image different from the predetermined image even if the set resolution is higher than the threshold.

8. The method according to claim 7, further comprising scanning a first image on a first surface of the document by a first scanning unit and scanning a second image on a second surface of the document by a second scanning unit different from the first surface.

9. The method according to claim 8, wherein the threshold is a value of ½ of a lower one of resolution of the first scanning unit and resolution of the second scanning unit.

10. The method according to claim 8, further comprising adjusting a difference obtained by comparing a color value of the predetermined image scanned by the first scanning unit and a color value of the predetermined image scanned by the second scanning unit.

11. The method according to claim 10, further comprising converting the color value obtained by the first scanning unit and the color value obtained by the second scanning unit with use of a lookup table, wherein the adjusting adjusts the lookup table.

12. The method according to claim 7, wherein the predetermined image is a color chart including a plurality of patches.

13. A method of controlling an image forming apparatus that includes a scanning unit configured to scan one or more images on a document, and a printing unit configured to execute a printing process, the method comprising:

setting resolution, that is received from a user and that is to be used in the printing process executed by the printing unit, executing, using the set resolution lower than or equal to a threshold, the printing process for a predetermined image for adjusting a color value to be obtained by a scan of the document by the scanning unit, executing, using resolution lower than or equal to the threshold and not using the set resolution higher than the threshold, the printing process for the predetermined image, and executing, using the set resolution, the printing process for an image different from the predetermined image even if the set resolution is higher than the threshold.

14. The method according to claim 13, further comprising scanning a first image on a first surface of the document by a first scanning unit and scanning a second image on a second surface of the document by a second scanning unit different from the first surface.

15. The method according to claim 14, wherein the threshold is a value of ½ of a lower one of resolution of the first scanning unit and resolution of the second scanning unit.

16. The method according to claim 13, further comprising receiving resolution from the user, wherein, based on the receiving resolution from the user, the setting sets the resolution that is to be used in the printing process executed by the printing unit.

17. The method according to claim 14, further comprising adjusting a difference obtained by comparing a color value of the predetermined image scanned by the first scanning unit and a color value of the predetermined image scanned by the second scanning unit.

18. The method according to claim 13, wherein the predetermined image is a color chart including a plurality of patches.

* * * * *